(12) United States Patent
Dodson et al.

(10) Patent No.: US 10,353,669 B2
(45) Date of Patent: Jul. 16, 2019

(54) MANAGING ENTRIES IN A MARK TABLE OF COMPUTER MEMORY ERRORS

(71) Applicant: International Business Machines Corporation, Armonk, NY (US)

(72) Inventors: John S. Dodson, Austin, TX (US); Marc A. Gollub, Round Rock, TX (US); Warren E. Maule, Cedar Park, TX (US); Brad W. Michael, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 15/255,543

(22) Filed: Sep. 2, 2016

(65) Prior Publication Data

US 2018/0067719 A1    Mar. 8, 2018

(51) Int. Cl.
| | |
|---|---|
| *G06F 3/06* | (2006.01) |
| *G06F 7/14* | (2006.01) |
| *G06F 11/00* | (2006.01) |
| *G06F 11/07* | (2006.01) |
| *G06F 11/10* | (2006.01) |
| *G06F 16/22* | (2019.01) |

(52) U.S. Cl.
CPC .............. *G06F 7/14* (2013.01); *G06F 3/0619* (2013.01); *G06F 11/00* (2013.01); *G06F 11/0766* (2013.01); *G06F 11/0772* (2013.01); *G06F 11/1016* (2013.01); *G06F 11/1048* (2013.01); *G06F 11/1064* (2013.01); *G06F 11/1076* (2013.01); *G06F 16/2282* (2019.01)

(58) Field of Classification Search
CPC ....... G11C 29/52; H03M 13/00; H03M 13/09; H03M 13/095; H03M 13/11; G06F 11/00; G06F 11/006; G06F 11/0766; G06F 11/0775; G06F 11/08; G06F 11/10; G06F 11/1016; G06F 11/1024; G06F 2212/403; G06F 11/1076; G06F 11/1064; G06F 7/14; G06F 16/2282; G06F 11/0772; G06F 11/1048; G06F 3/0619
See application file for complete search history.

(56) References Cited

U.S. PATENT DOCUMENTS

| | | |
|---|---|---|
| 4,209,809 A | 6/1980 | Chang et al. |
| 4,506,362 A | 3/1985 | Morley |
| 4,577,240 A | 3/1986 | Hedberg et al. |
| 4,939,694 A | 7/1990 | Eaton et al. |
| 4,964,129 A | 10/1990 | Bowden, III et al. |
| 4,964,130 A | 10/1990 | Bowden, III et al. |
| 5,014,273 A | 5/1991 | Gagliardo et al. |
| 5,390,309 A | 2/1995 | Onodera |
| 5,644,539 A | 7/1997 | Yamagami et al. |

(Continued)

OTHER PUBLICATIONS

Appendix P; List of IBM Patent or Applications Treated as Related, Dec. 2, 2016, 2 pages.

*Primary Examiner* — David T. Brooks
(74) *Attorney, Agent, or Firm* — Nathan M. Rau

(57) ABSTRACT

Managing entries in a mark table of computer memory errors including identifying at least two mark table entries as candidates for merger, wherein each mark table entry indicates an error at a location in a computer memory; and merging the identified mark table entries into a single mark table entry, including removing one of the identified mark table entries from the mark table.

14 Claims, 7 Drawing Sheets

(56) References Cited

U.S. PATENT DOCUMENTS

| | | | |
|---|---|---|---|
| 5,872,905 A | 2/1999 | Ono et al. | |
| 8,352,806 B2 | 1/2013 | Gollub et al. | |
| 8,484,529 B2 | 7/2013 | Alves et al. | |
| 8,650,437 B2 | 2/2014 | Fry et al. | |
| 8,689,080 B2 | 4/2014 | Carman et al. | |
| 8,862,953 B2 | 10/2014 | Gollub et al. | |
| 9,092,361 B2 | 7/2015 | Honda et al. | |
| 9,244,852 B2 | 1/2016 | Prasad | |
| 2002/0191319 A1* | 12/2002 | Liew | G11B 20/1816 360/53 |
| 2003/0088805 A1 | 5/2003 | Majno et al. | |
| 2004/0078700 A1* | 4/2004 | Jeong | G11C 29/765 714/42 |
| 2006/0007801 A1 | 1/2006 | Takashima | |
| 2008/0010566 A1* | 1/2008 | Chang | G06F 11/1024 714/718 |
| 2008/0072118 A1 | 3/2008 | Brown et al. | |
| 2009/0164727 A1 | 6/2009 | Penton et al. | |
| 2009/0300425 A1* | 12/2009 | Gollub | G06F 11/0715 714/42 |
| 2009/0313526 A1* | 12/2009 | Neuman | G06F 11/10 714/758 |
| 2010/0037044 A1* | 2/2010 | Yang | G06F 9/4401 713/100 |
| 2010/0058144 A1* | 3/2010 | Rohleder | G06F 11/1024 714/763 |
| 2010/0287445 A1 | 11/2010 | Dell et al. | |
| 2010/0293437 A1 | 11/2010 | Gollub et al. | |
| 2011/0320911 A1* | 12/2011 | Fry | G06F 11/1048 714/758 |
| 2011/0320914 A1* | 12/2011 | Alves | G06F 11/1004 714/770 |
| 2012/0173936 A1* | 7/2012 | Johnson | G06F 11/1044 714/718 |
| 2013/0007542 A1 | 1/2013 | Carman et al. | |
| 2013/0326293 A1* | 12/2013 | Muralimanohar | G11C 29/08 714/718 |
| 2014/0026011 A1* | 1/2014 | Huang | H03M 13/05 714/763 |
| 2014/0195867 A1 | 7/2014 | Gollub et al. | |
| 2014/0223239 A1* | 8/2014 | Mittal | G06F 11/073 714/42 |
| 2015/0089280 A1 | 3/2015 | Sade et al. | |
| 2016/0132259 A1* | 5/2016 | Dell | G06F 3/0619 714/37 |
| 2016/0239228 A1 | 8/2016 | Bennett | |
| 2018/0067798 A1 | 3/2018 | Dodson et al. | |
| 2018/0067806 A1 | 3/2018 | Dodson et al. | |
| 2018/0068741 A1 | 3/2018 | Dodson et al. | |

* cited by examiner

US 10,353,669 B2

MANAGING ENTRIES IN A MARK TABLE OF COMPUTER MEMORY ERRORS

BACKGROUND

Field of the Invention

The field of the invention is data processing, or, more specifically, methods, apparatus, and products for managing entries in a mark table of computer memory errors.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for managing entries in a mark table of computer memory errors are disclosed in this specification. Managing entries in a mark table of computer memory errors includes identifying at least two mark table entries as candidates for merger, wherein each mark table entry indicates an error at a location in a computer memory; and merging the identified mark table entries into a single mark table entry, including removing one of the identified mark table entries from the mark table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
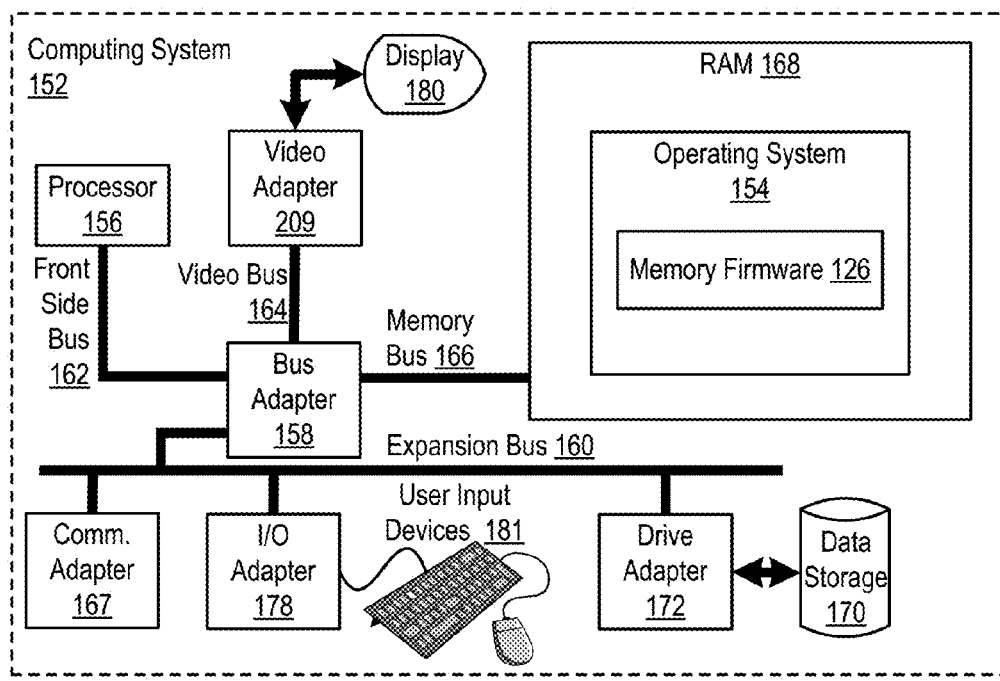
FIG. 1 sets forth a block diagram of an example system configured for managing entries in a mark table of computer memory errors according to embodiments of the present invention.

Exemplary methods, apparatus, and products for managing entries in a mark table of computer memory errors in accordance with the present invention are described with reference to the accompanying drawings, beginning with FIG. 1. FIG. 1 sets forth a block diagram of automated computing machinery comprising an exemplary computing system (152) configured for managing entries in a mark table of computer memory errors according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for managing entries in a mark table of computer memory errors according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and part of the operating system is the memory firmware (126), a module of computer program instructions for managing entries in a mark table of computer memory errors.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for managing entries in a mark table of computer memory errors according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing entries in a mark table of computer memory errors according to embodiments of the present invention include modems for wired dial-up communications, Ethernet (IEEE 802.3) adapters for wired data communications, and 802.11 adapters for wireless data communications.

Figure 2:
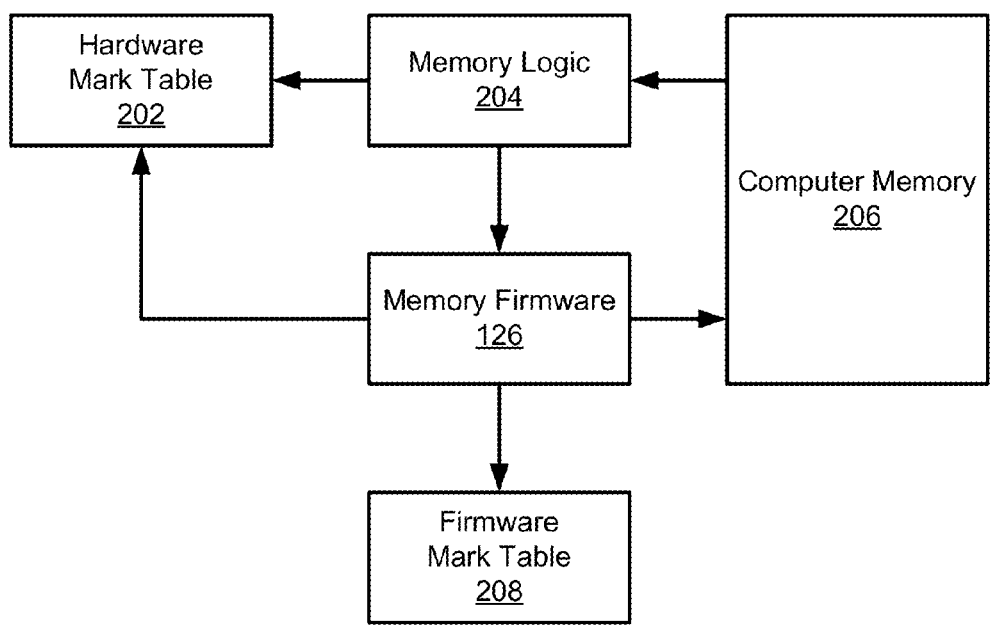
FIG. 2 sets forth a block diagram for managing entries in a mark table of computer memory errors according to embodiments of the present invention.

FIG. 2 is an example block diagram of a system configured for managing entries in a mark table of computer memory errors. FIG. 2 includes a hardware mark table (202), memory logic (204), computer memory (206) (such as RANI (168)), memory firmware (126), and a firmware mark table (208).

The error correction code (ECC) system uses two types of marks that correspond to different sets of bit error locations. Symbol marks indicate errors expected in one or more bits associated with a particular DRAM data bit. Such errors may be caused, for example, by a faulty DRAM data I/O pin or by a DRAM internal failure which affects only bits within the set. Chip marks indicate errors expected in one or more bits associated with a particular DRAM chip. Such errors may be caused, for example, by multiple faulty DRAM data I/O pins, a faulty dram address or control I/O pin, or a DRAM internal failure which affects a larger portion of data than would be covered by a symbol mark. A chip mark is equivalent to a set of symbol marks covering all data from one DRAM chip.

The hardware mark table (202) is a data structure architected in hardware with fields that may be altered. The hardware mark table (202) may be a part of the computer memory (206) hardware, the CPU hardware, or another hardware structure within the computing system. The hardware mark table (202) is configured to store information about detected errors within the computer memory (206). Specifically, the hardware mark table (202) may store a chip mark for a single region (e.g., a rank) within the computer memory (206). Mark table entries in the hardware mark table (202) are referred to as hardware mark store (HWMS) entries.

The hardware mark table (202) may be limited to storing a single type of error (e.g., a chip mark). Further, the hardware mark table (202) may also be limited to indicating an error in a single region level. For example, each HWMS entry in the hardware mark table (202) may store a chip mark for one or more ranks in the computer memory (206) (i.e., the exact address of the error may not be programmable in the table). The hardware mark table (202) may be unable to store a second error indication (e.g., a symbol mark) or indicate that the error applies to a broader or narrower set of elements within the computer memory (206) (e.g., a dual in-line memory module (DIMM), a group of banks, or a bank).

The memory logic (204) is a collection of programs within hardware, software, or firmware that detects errors within the computer memory (206) and reports those errors using the hardware mark table (202). The memory logic (204) may be limited in the types and applicability of the errors the memory logic (204) is able to report. For example, the memory logic (204) may only be able to detect one type of error in one region (e.g., at least one unreliable 4 bit word within a rank).

The computer memory (206) is a group of bit storage devices used to store data for a computing system. The computer memory (206) may include a hierarchy of components. For example, each bit storage device may be a capacitor, and the capacitors may be grouped in banks. The banks may be grouped in bank groups, a set of bank groups may be organized into a rank, and a set of ranks may be organized into a DIMM.

The memory firmware (126) is a collection of programs within the computing system used to facilitate interoperability between the software components on the computing system and the memory hardware. The memory firmware (126) may be part of an operating system or hypervisor executing on the computing system. The memory firmware (126) may further include functionality to initiate a scan of the computer memory using, for example, a scrub engine that scans a region of the computer memory (206) to obtain information about the error, such as the type of error and the range of memory addresses affected by the error. The memory firmware (126) may then store the information in the firmware mark table (208).

The firmware mark table (208) is a mark table used by the memory firmware (126) to store information about detected errors in the computer memory (206). The firmware mark table (208) may store more information about detected errors then may be stored in the hardware mark table (202). Each mark table entry in the firmware mark table (208) may include a match address, a region size, and a mark location for each error detected by the memory firmware (126). Each mark table entry in the firmware mark table (208) may include a programmable address indicating the location of the error within the computer memory. The programmable address may be more precise than the location indication stored in the mark table entries of the hardware mark table (202). Mark table entries in the firmware mark table (208) are referred to as firmware mark store (FWMS) entries. The term "mark table entry" may refer to either a FWMS entry or a HWMS entry.

Each FWMS entry in the firmware mark table (208) may include a chip mark and/or a symbol mark. A set of failures may be described precisely in the firmware mark table (208) if no address has a greater number of failures than can be accommodated by error correcting code. Although FIG. 2 shows the hardware mark table (202) and the firmware mark table (208) as separately implemented tables, the hardware mark table (202) and the firmware mark table (208) may be implemented as a single table (e.g., a single firmware mark table).

The firmware mark table (208) may be stored in content-addressable memory (CAM) such that the contents may be retrieved using a CAM lookup. The firmware mark table (208) may be configured such that mark table entries may be retrieved by matching a memory address to a match address of a mark table entry in the firmware mark table (208). A matching mark table entry may also incorporate the region size to determine a match. Specifically, a match may be a hit if the given memory address is within the same specified region as the match address.

Figure 3:
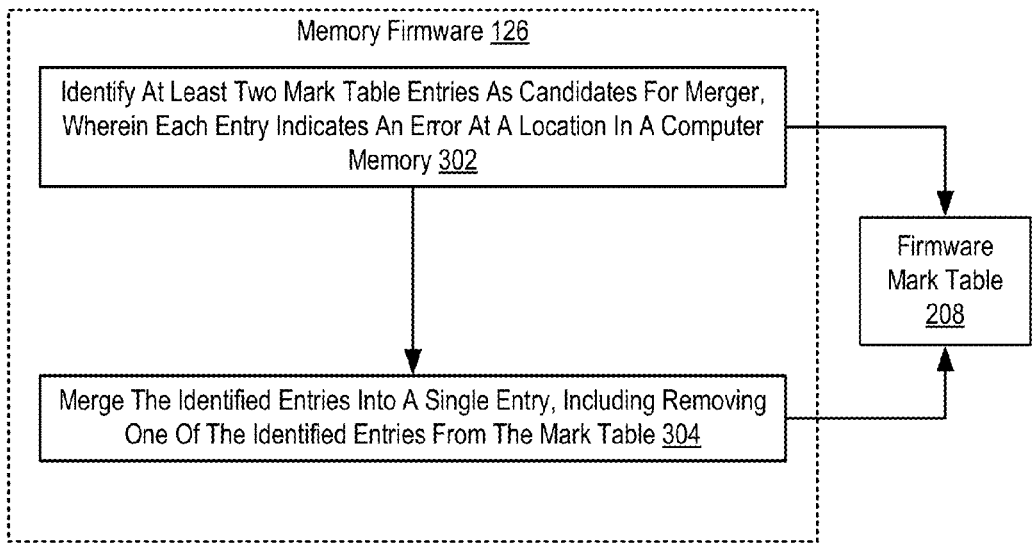
FIG. 3 sets forth a flow chart illustrating an exemplary method for managing entries in a mark table of computer memory errors according to embodiments of the present invention.

For further explanation, FIG. 3 sets forth a flow chart illustrating an exemplary method for managing entries in a mark table of computer memory errors according to embodiments of the present invention. The method of FIG. 3 includes identifying (302) at least two mark table entries as candidates for merger, wherein each mark table entry indicates an error at a location in a computer memory. Identifying (302) at least two mark table entries as candidates for merger, wherein each mark table entry indicates an error at a location in a computer memory may be carried out by evaluating, by the memory firmware (126), each mark table entry in the firmware mark table (208) and the hardware mark table (202) to determine at least one mark table entry that may be merged with another mark table entry.

The two identified mark table entries may both be from the firmware mark table (208), or one may be from the firmware mark table (208) and one may be from the hardware mark table (202), or both mark table entries may be from the hardware mark table (202). Identifying (302) at least two mark table entries as candidates for merger, wherein each mark table entry indicates an error at a location in a computer memory may be carried out by identifying a mark table entry in the firmware mark table (208) or the hardware mark table (202) that is no longer in use (e.g., a mark table entry containing a valid element indicating the mark table entry is no longer valid).

Identifying (302) at least two mark table entries as candidates for merger, wherein each mark table entry indicates an error at a location in a computer memory may be carried out using one or more mark table entry merging policies. The merging policies may describe characteristics of candidate mark table entries and algorithms for merging two or more candidate mark table entries. The memory firmware (126) may periodically evaluate the mark table entries in the firmware mark table (208) and the hardware mark table (202) to determine any mark table entries that match any of characteristics of the candidate mark table entries described in the merging policies.

The evaluation and application of the policies may be triggered by a number of events. The identifying (302) at least two mark table entries as candidates for merger may be performed in response to determining that one or more mark tables (e.g., the firmware mark table (208), the hardware mark table (202)) has no available mark table entries (i.e., is full). Identifying (302) at least two mark table entries as candidates for merger may be performed periodically as part of maintaining the mark tables, or may be performed on each memory read operation.

The method of FIG. 3 also includes merging (304) the identified mark table entries into a single mark table entry, including removing one of the identified mark table entries from the mark table (208). Merging the identified mark table entries into a single mark table entry, including removing one of the identified mark table entries from the mark table (208) may be carried out by merging two firmware mark store (FWMS) entries into a single FWMS entry, merging a FWMS entry and a hardware mark store (HWMS) entry into a single FWMS entry, or merging a FWMS entry and a HWMS entry into a single HWMS entry.

Removing one of the identified mark table entries from the mark table (208) may be carried out by altering an element within one of the mark table entries indicating that the mark table entry is no longer valid. For example, a valid bit of one of the mark table entries may be altered from a '1' to a '0', indicating the mark table entry is no longer valid and may be overwritten.

By merging (304) the identified mark table entries into a single mark table entry, some information regarding the specificity of some errors described in the identified mark table entries may be lost in exchange for the efficient management of the mark tables. There may be a loss of future correctability due to merged errors covering address regions that include no detected errors. The total cost may be calculated by adding a chip cost to a symbol cost. The chip cost may be calculated as a 'chip weight' times the total region size of chip marks, less the total region size of chip failures. The symbol cost may be calculated as a 'symbol weight' times the total region size of symbol marks, less the total region size of symbol failures. The merging policies may calculate this cost in determining whether to merge two identified mark table entries.

Figure 4:
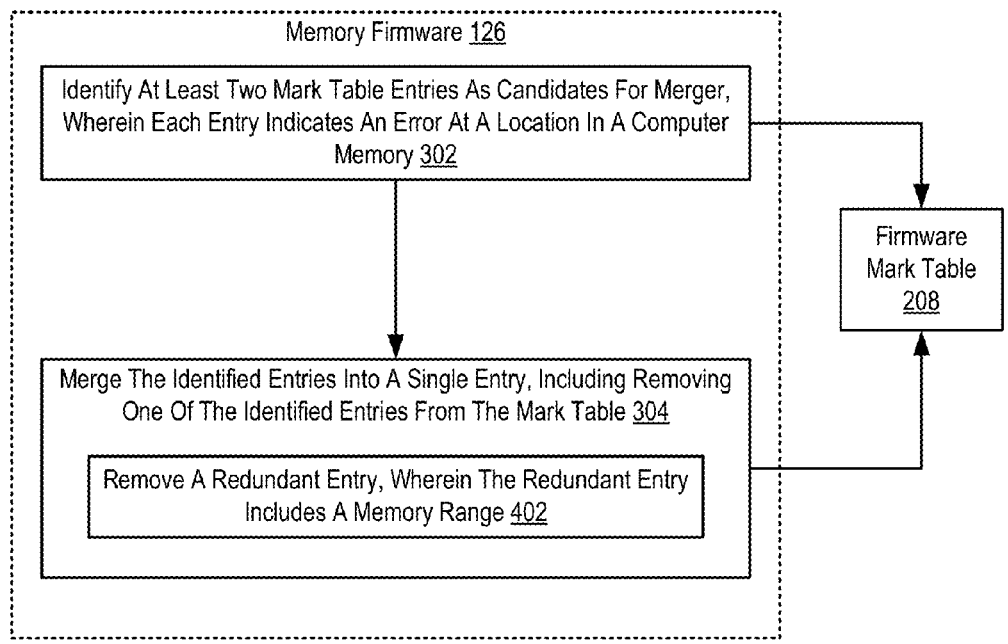
FIG. 4 sets forth a flow chart illustrating an exemplary method for managing entries in a mark table of computer memory errors according to embodiments of the present invention.

For further explanation, FIG. 4 sets forth a flow chart illustrating an exemplary method for managing entries in a mark table of computer memory errors according to embodiments of the present invention that includes identifying (302) at least two mark table entries as candidates for merger, wherein each mark table entry indicates an error at a location in a computer memory; and merging (304) the identified mark table entries into a single mark table entry, including removing one of the identified mark table entries from the mark table (208).

The method of FIG. 4 differs from the method of FIG. 3, however, in that merging (304) the identified mark table entries into a single mark table entry, including removing one of the identified mark table entries from the mark table (208) includes removing (402) a redundant mark table entry, wherein the redundant mark table entry includes a memory range. Removing (402) a redundant mark table entry, wherein the redundant mark table entry includes a memory range may be carried out by removing a FWMS entry from the firmware mark table (208). Removing (402) a redundant mark table entry, wherein the redundant mark table entry includes a memory range may also be carried out by altering an element within one of the mark table entries indicating that the mark table entry is no longer valid.

A FWMS entry may be removed from the firmware mark table (208) during the merging processes because an existing or newly created HWMS entry in the hardware mark table (202) describes, or has been determine to describe, the same error described in the FWMS entry. For example, a HWMS entry may describe an error at rank A. A FWMS entry may describe an error at memory address '34'. The memory firmware (126) may evaluate the FWMS entry and the HWMS entry, and determine that, because memory address '34' is in rank A, the mark table entries should be merged. The memory firmware (126) may then remove the FWMS entry because the error is described (although not as precisely) in the HWMS entry.

Figure 5:
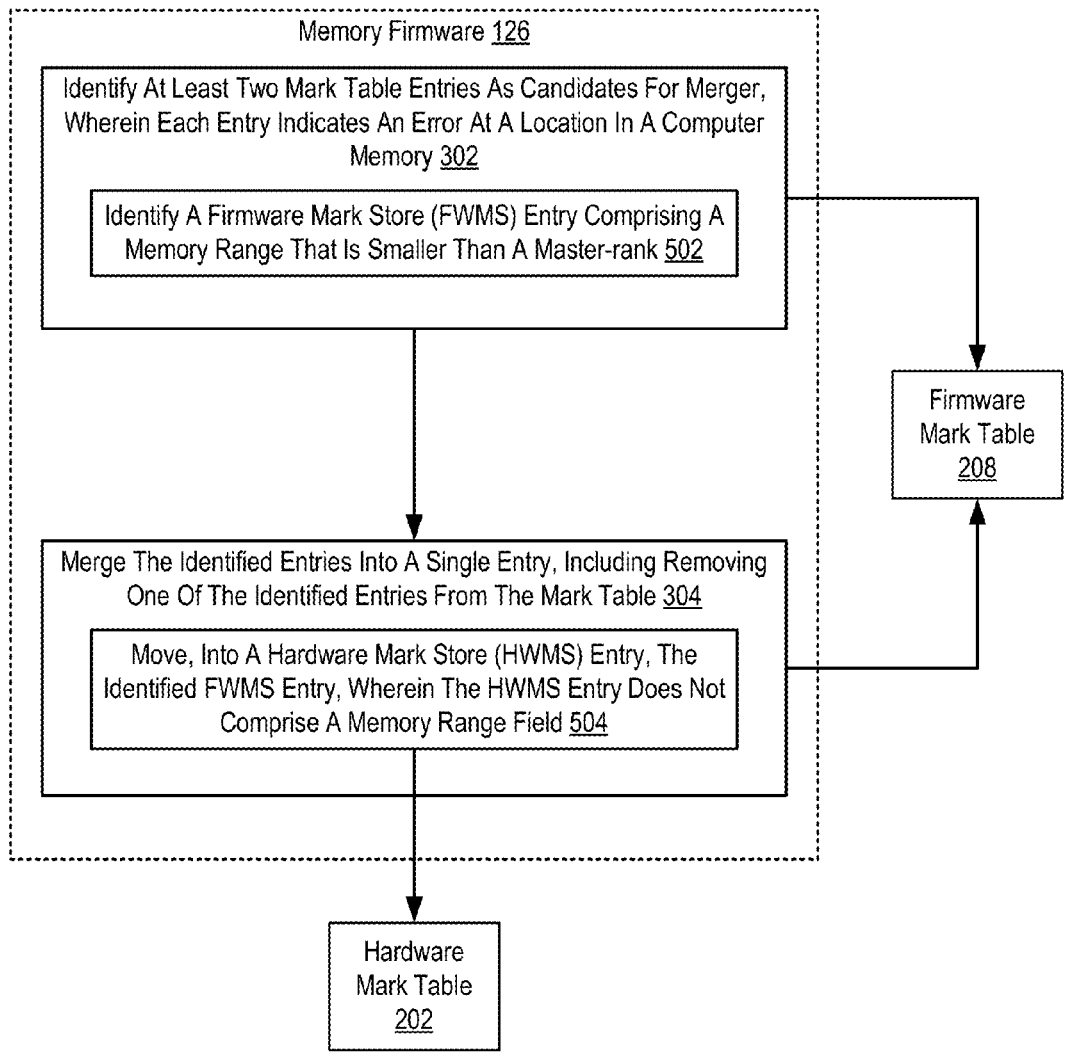
FIG. 5 sets forth a flow chart illustrating an exemplary method for managing entries in a mark table of computer memory errors according to embodiments of the present invention.

For further explanation, FIG. 5 sets forth a flow chart illustrating an exemplary method for managing entries in a mark table of computer memory errors according to embodiments of the present invention that includes identifying (302) at least two mark table entries as candidates for merger, wherein each mark table entry indicates an error at a location in a computer memory; and merging (304) the identified mark table entries into a single mark table entry, including removing one of the identified mark table entries from the mark table (208).

The method of FIG. 5 differs from the method of FIG. 3, however, in that identifying (302) at least two mark table entries as candidates for merger, wherein each mark table entry indicates an error at a location in a computer memory includes identifying (502) a firmware mark store (FWMS)

entry comprising a memory range that is smaller than a master-rank. Identifying (502) a firmware mark store (FWMS) entry comprising a memory range that is smaller than a master-rank may be carried out by comparing the memory range in the FWMS entry to the memory ranges of the master-ranks and determining that the memory range in the FWMS entry is contained within a single master-rank (i.e., the memory range does not extend beyond a master-rank boundary).

For example, a FWMS entry may include the memory range '27' through '33'. The memory firmware (126) may determine that the memory range is entirely within master-rank B, which includes the memory range of '20' through '40'. The memory firmware (126) may conclude that the memory range is smaller than master-rank B.

The method of FIG. 4 also differs from the method of FIG. 3, however, in that merging (304) the identified mark table entries into a single mark table entry, including removing one of the identified mark table entries from the mark table (208) includes moving (504), into a hardware mark store (HWMS) entry, the identified FWMS entry, wherein the HWMS entry does not comprise a memory range field. Moving (504), into a hardware mark store (HWMS) entry, the identified FWMS entry, wherein the HWMS entry does not comprise a memory range field may be carried out by creating a new HWMS entry in the hardware mark store (202) and indicating that an error has been detected at the master-rank that encompasses the FWMS entry address range.

Continuing with the example from above, the memory firmware (126) may, directly or via the memory logic (204), create an HWMS entry indicating an error in master-rank B. The HWMS may not include a memory range, rather only that an error has been detected within master-rank B. The memory firmware (126) may then remove the FWMS entry.

Figure 6:
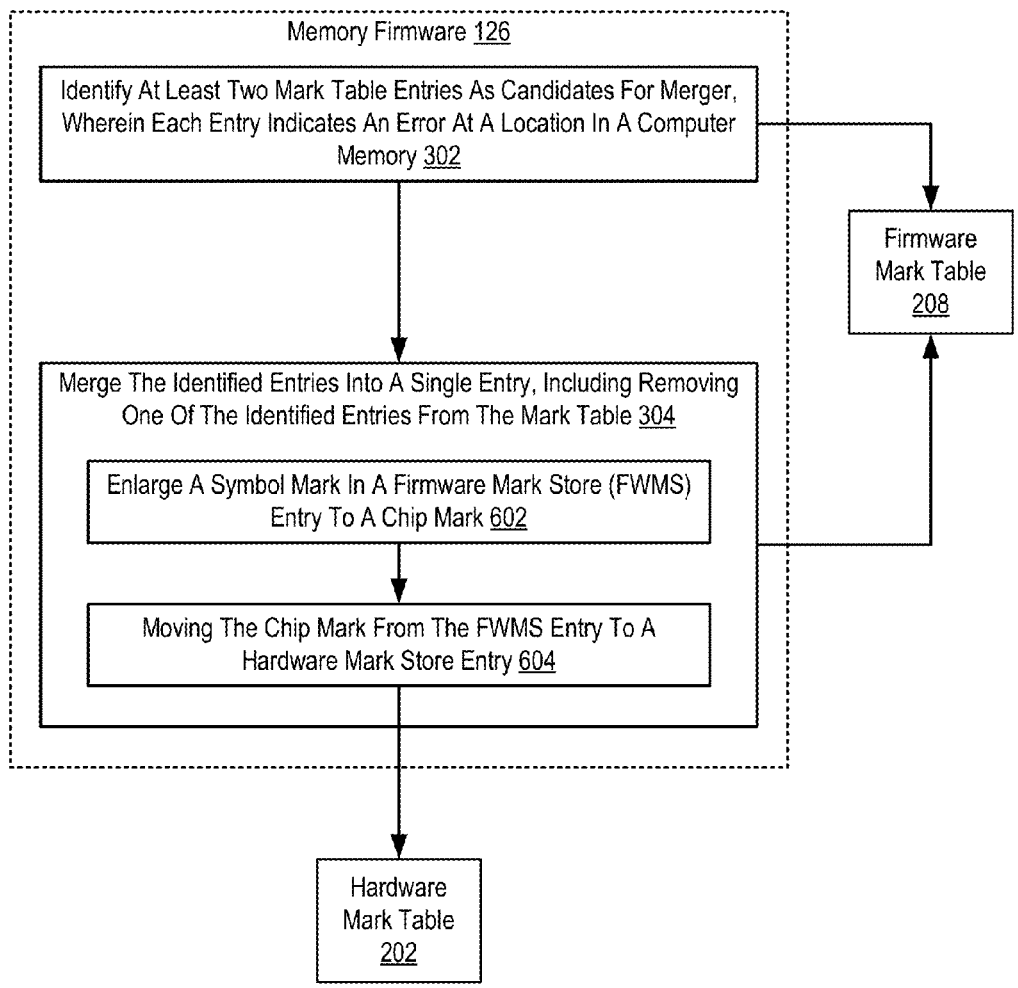
FIG. 6 sets forth a flow chart illustrating an exemplary method for managing entries in a mark table of computer memory errors according to embodiments of the present invention.

For further explanation, FIG. 6 sets forth a flow chart illustrating an exemplary method for managing entries in a mark table of computer memory errors according to embodiments of the present invention that includes identifying (302) at least two mark table entries as candidates for merger, wherein each mark table entry indicates an error at a location in a computer memory; and merging (304) the identified mark table entries into a single mark table entry, including removing one of the identified mark table entries from the mark table (208).

The method of FIG. 6 differs from the method of FIG. 3, however, in that merging (304) the identified mark table entries into a single mark table entry, including removing one of the identified mark table entries from the mark table (208) includes enlarging (602) a symbol mark in a firmware mark store (FWMS) entry to a chip mark; and moving (604) the chip mark from the FWMS entry to a hardware mark store entry. Enlarging (602) a symbol mark in a firmware mark store (FWMS) entry to a chip mark may be carried out by determining that a FWMS entry containing a symbol mark (indicating that the error is at a specific bit within the region) may be converted into a HWMS entry containing a chip mark (indicating that the error is within a range of bits, such as within a 4-bit word). Such an enlargement sacrifices the specificity of the symbol mark in order to store the error in the hardware mark table (202), thus freeing a FWMS entry in the firmware mark table (208). The memory firmware (126) may then overwrite the description of the symbol mark in the FWMS with a description of a chip mark.

For example, the memory firmware (126) may determine that a new mark table entry must be created in the firmware mark table (208) to store a newly detected error. However, the memory firmware (126) may also determine that the firmware mark table (208) is currently full. The memory firmware (126) may evaluate the mark table entries in the firmware mark table (208) and determine that one mark table entry contains a symbol mark that may be converted into a chip mark and stored in the hardware mark table (202). Specifically, the memory firmware (126) may determine that the symbol mark (indicating a specific bit) may be more broadly described using a chip mark (indicating a range of bits or general location of the error).

Moving (604) the chip mark from the FWMS entry to a hardware mark store entry may be carried out by creating a HWMS entry in the hardware mark table (202) and populating the HWMS entry with the information from the identified FWMS entry, including the chip mark. Populating the HWMS entry may include excluding information stored in the FWMS entry, such as a memory range or other symbol marks.

Figure 7:
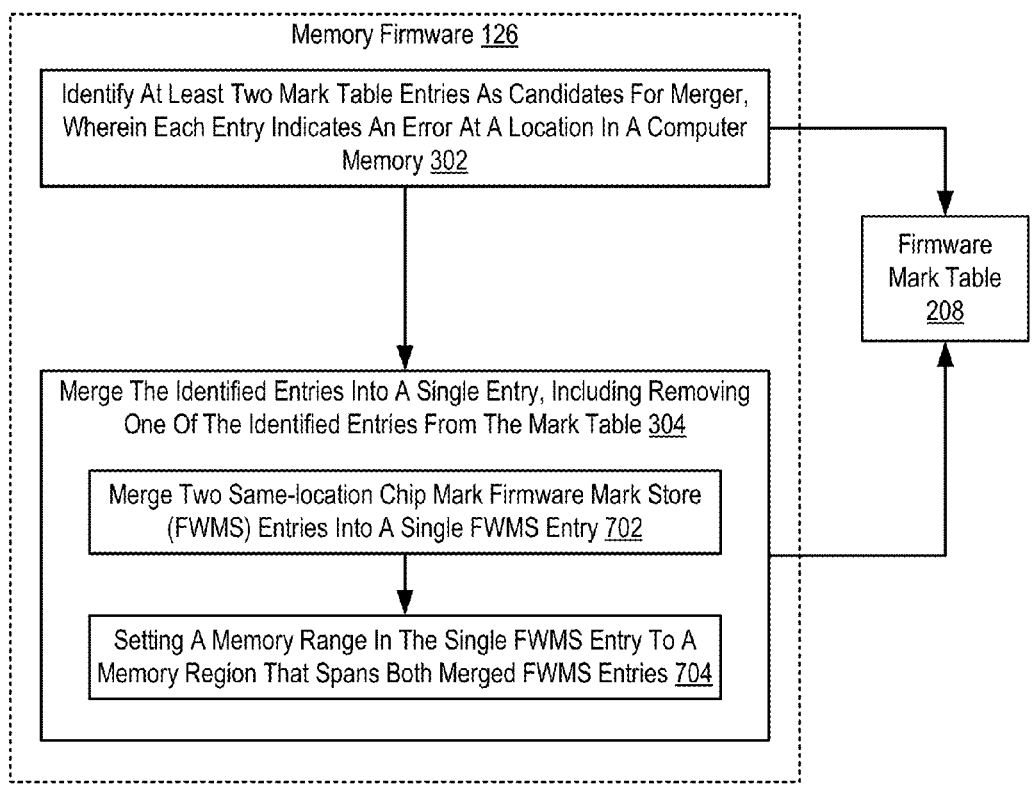
FIG. 7 sets forth a flow chart illustrating an exemplary method for managing entries in a mark table of computer memory errors according to embodiments of the present invention.

For further explanation, FIG. 7 sets forth a flow chart illustrating an exemplary method for managing entries in a mark table of computer memory errors according to embodiments of the present invention that includes identifying (302) at least two mark table entries as candidates for merger, wherein each mark table entry indicates an error at a location in a computer memory; and merging (304) the identified mark table entries into a single mark table entry, including removing one of the identified mark table entries from the mark table (208).

The method of FIG. 7 differs from the method of FIG. 3, however, in that merging (304) the identified mark table entries into a single mark table entry, including removing one of the identified mark table entries from the mark table (208) includes merging (702) two same-location chip mark firmware mark store (FWMS) entries into a single FWMS entry; and setting (704) a memory range in the single FWMS entry to a memory region that spans both merged FWMS entries. Merging (702) two same-location chip mark firmware mark store (FWMS) entries into a single FWMS entry may be carried out by determining that the memory ranges of two FWMS entries are sufficiently proximate to merge the two FWMS entries. Such a sufficient proximity may be determined using the merging policy. Further, the proximity may include both overlapping memory ranges and non-contiguous memory ranges.

For example, the memory firmware (126) may evaluate the firmware mark table (208) and determine that one FWMS entry A has a memory range of '25' through '35', and FWMS entry B has a memory range of '41' through '50'. Further, assume a merging policy instructs the memory firmware (126) to merge any two FWMS entries with a range difference of less than 30% of the total merged range. The range difference between FWMS entry A and FWMS entry B (memory locations '36' through '40') is less than 30% of the total merged range (memory locations '25' through '50') of the two mark table entries. Therefore, the memory firmware (126) may merge the FWMS entry A and FWMS entry B into a single FWMS entry by removing FWMS entry A and setting the memory range in FWMS entry B to span both merged FWMS entries.

Setting (704) a memory range in the single FWMS entry to a memory region that spans both merged FWMS entries may be carried out by altering the memory range field within the FWMS entry to begin with the lowest numbered memory location between the two memory ranges, and end with the highest numbered memory location between the two memory ranges. Continuing with the above example, the memory firmware (126) may set the memory region of the remaining FWMS entry (mark table entry B) to begin with memory location '25' and end with memory location '50'.

In view of the explanations set forth above, readers will recognize that the benefits of managing entries in a mark table of computer memory errors according to embodiments of the present invention include:

Improving the operation of a computer system by efficiently maintaining mark tables within a computer system to increase memory reliability and efficiency.

Improving the operation of a computer system by efficiently tracking memory errors through management of the mark tables to increase memory reliability and efficiency.

Improving the operation of a computer system by aiding implementation of mark tables that include additional memory error information to increase memory reliability and efficiency.

Exemplary embodiments of the present invention are described largely in the context of a fully functional computer system for managing entries in a mark table of computer memory errors. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing mark table entries in at least one of a plurality of mark tables of computer memory errors, wherein at least one of the plurality of mark tables is a firmware mark table, wherein the firmware mark table is located in content-addressable memory, the method comprising:
    identifying at least two mark table entries as candidates for merger, wherein each mark table entry indicates an error at a location in a computer memory; and
    merging the identified mark table entries into a single mark table entry, including removing one of the identified mark table entries from the mark table, wherein merging the identified mark table entries into a single mark table entry comprises moving a firmware mark store (FWMS) entry into a hardware mark store (HWMS) entry, including, prior to moving the FWMS entry, at least one of:
        identifying the FWMS entry as having a memory range that is smaller than a master-rank, and
        enlarging a symbol mark in the FWMS entry into a chip mark.

2. The method of claim 1, wherein merging the identified mark table entries into the single mark table entry comprises one selected from a group consisting of:
    merging two firmware mark store (FWMS) entries into a single FWMS entry,
    merging a FWMS entry and a hardware mark store (HWMS) entry into a single FWMS entry, and
    merging a FWMS entry and a HWMS entry into a single HWMS entry.

3. The method of claim 1, wherein merging the identified mark table entries into the single mark table entry comprises:
    removing a redundant mark table entry, wherein the redundant mark table entry includes a memory range.

4. The method of claim 1,
    wherein the HWMS entry does not comprise a memory range field.

5. The method of claim 1, wherein merging the identified mark table entries into a single mark table entry comprises:
    merging two same-location chip mark firmware mark store (FWMS) entries into a single FWMS entry; and
    setting a memory range in the single FWMS entry to a memory region that spans both merged FWMS entries.

6. An apparatus for managing mark table entries in at least one of a plurality of mark tables of computer memory errors, wherein at least one of the plurality of mark tables is a firmware mark table, wherein the firmware mark table is located in content-addressable memory, the apparatus comprising a computer processor and a computer memory operatively coupled to the computer processor, wherein the computer memory comprises computer program instructions that, when executed by the computer processor, cause the apparatus to carry out the steps of:
    identifying at least two mark table entries as candidates for merger, wherein each mark table entry indicates an error at a location in a computer memory; and
    merging the identified mark table entries into a single mark table entry, including removing one of the identified mark table entries from the mark table, wherein merging the identified mark table entries into a single mark table entry comprises moving a firmware mark store (FWMS) entry into a hardware mark store (HWMS) entry, including, prior to moving the FWMS entry, at least one of:
        identifying the FWMS entry as having a memory range that is smaller than a master-rank, and
        enlarging a symbol mark in the FWMS entry into a chip mark.

7. The apparatus of claim 6, wherein merging the identified mark table entries into the single mark table entry comprises one selected from a group consisting of:
    merging two firmware mark store (FWMS) entries into a single FWMS entry,
    merging a FWMS entry and a hardware mark store (HWMS) entry into a single FWMS entry, and
    merging a FWMS entry and a HWMS entry into a single HWMS entry.

8. The apparatus of claim 6, wherein merging the identified mark table entries into the single mark table entry comprises:
    removing a redundant mark table entry, wherein the redundant mark table entry includes a memory range.

9. The apparatus of claim 6,
    wherein the HWMS entry does not comprise a memory range field.

10. The apparatus of claim 6, wherein merging the identified mark table entries into a single mark table entry comprises:
    merging two same-location chip mark firmware mark store (FWMS) entries into a single FWMS entry; and setting a memory range in the single FWMS entry to a memory region that spans both merged FWMS entries.

11. A computer program product for managing mark table entries in at least one of a plurality of mark tables of computer memory errors, wherein at least one of the plurality of mark tables is a firmware mark table, wherein the firmware mark table is located in content-addressable memory, the computer program product disposed upon a computer readable storage medium, the computer program product comprising computer program instructions that, when executed, cause a computer to carry out the steps of:

identifying at least two mark table entries as candidates for merger, wherein each mark table entry indicates an error at a location in a computer memory; and merging the identified mark table entries into a single mark table entry, including removing one of the identified mark table entries from the mark table, wherein merging the identified mark table entries into a single mark table entry comprises moving a firmware mark store (FWMS) entry into a hardware mark store (HWMS) entry, including, prior to moving the FWMS entry, at least one of:

identifying the FWMS entry as having a memory range that is smaller than a master-rank, and enlarging a symbol mark in the FWMS entry into a chip mark.

12. The computer program product of claim 11, wherein merging the identified mark table entries into the single mark table entry comprises one selected from a group consisting of:

merging two firmware mark store (FWMS) entries into a single FWMS entry, merging a FWMS entry and a hardware mark store (HWMS) entry into a single FWMS entry, and merging a FWMS entry and a HWMS entry into a single HWMS entry.

13. The computer program product of claim 11, wherein merging the identified mark table entries into the single mark table entry comprises:

removing a redundant mark table entry, wherein the redundant mark table entry includes a memory range.

14. The computer program product of claim 11, wherein the HWMS entry does not comprise a memory range field.

\* \* \* \* \*